(12) United States Patent
Laller et al.

(10) Patent No.: US 12,271,695 B2
(45) Date of Patent: Apr. 8, 2025

(54) TEXT RECONSTRUCTION SYSTEM AND METHOD THEREOF

(71) Applicant: Samsung Electronics Co., Ltd., Suwon-si (KR)

(72) Inventors: Nitesh Laller, Noida (IN); Sujit Kumar Sinha, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 534 days.

(21) Appl. No.: 17/612,532

(22) PCT Filed: May 19, 2020

(86) PCT No.: PCT/KR2020/006517
§ 371 (c)(1),
(2) Date: Nov. 18, 2021

(87) PCT Pub. No.: WO2020/235910
PCT Pub. Date: Nov. 26, 2020

(65) Prior Publication Data
US 2022/0237379 A1    Jul. 28, 2022

(30) Foreign Application Priority Data

May 20, 2019  (IN) .............................. 201911020003

(51) Int. Cl.
*G06F 40/284* (2020.01)
*G06F 40/40* (2020.01)
(Continued)

(52) U.S. Cl.
CPC ............ *G06F 40/284* (2020.01); *G06F 40/40* (2020.01); *G06F 40/56* (2020.01); *G06F 40/58* (2020.01);
(Continued)

(58) Field of Classification Search
CPC .......... G10L 15/02; G10L 15/22; G10L 15/26; G06F 40/284; G06F 40/40; G06F 40/56; G06F 40/58
See application file for complete search history.

(56) References Cited

U.S. PATENT DOCUMENTS 7,006,967 B1 * 2/2006 Kahn ................... G10L 15/075
                                                                704/277
7,054,804 B2    5/2006 Gonzales et al.
(Continued)

FOREIGN PATENT DOCUMENTS

| CN | 104602136 A | 5/2015 |
|---|---|---|
| KR | 10-2014-0077730 A | 6/2014 |
| KR | 10-2017-0013712 A | 2/2017 |

OTHER PUBLICATIONS

International Search Report and Written Opinion of the International Searching Authority dated Sep. 3, 2020, in connection with International Application No. PCT/KR2020/006517, 9 pages.
(Continued)

*Primary Examiner* — Paras D Shah
*Assistant Examiner* — Oluwadamilola M Ogunbiyi

(57) ABSTRACT

A text reconstruction system for reconstructing a primary text data is provided. A voice input signal of a user is converted into an input text data by a speech recognition module. A text classifier module generates one or more tokens and adds the tokens into a word bag corresponding to the user. A text identifier module generates a text corpus based on the input text data. A user profile builder module creates a user profile based on the word bag, the input text data, and the text corpus. A decision module determines, based on the word bag, whether the primary data is to be reconstructed and reconstructs the primary text data to generate a personalized text data based on the user profile.

11 Claims, 14 Drawing Sheets

(51) Int. Cl.
*G06F 40/56* (2020.01)
*G06F 40/58* (2020.01)
*G06N 20/00* (2019.01)
*G10L 15/02* (2006.01)
*G10L 15/22* (2006.01)
*G10L 15/26* (2006.01)

(52) U.S. Cl.
CPC .............. *G10L 15/02* (2013.01); *G10L 15/22* (2013.01); *G10L 15/26* (2013.01); *G06N 20/00* (2019.01)

(56) References Cited

U.S. PATENT DOCUMENTS

| | | | | |
|---|---|---|---|---|
| 7,219,123 | B1* | 5/2007 | Fiechter | G10L 15/26 |
| | | | | 715/728 |
| 8,589,157 | B2 | 11/2013 | Ju et al. | |
| 9,472,186 | B1* | 10/2016 | Clark | G16H 15/00 |
| 9,696,881 | B2 | 7/2017 | Pornprasitsakul et al. | |
| 9,854,324 | B1 | 12/2017 | Panchaksharaiah et al. | |
| 10,573,312 | B1* | 2/2020 | Thomson | G10L 15/22 |
| 11,011,157 | B2* | 5/2021 | Dernoncourt | G10L 15/26 |
| 2003/0040899 | A1 | 2/2003 | Ogilvie | |
| 2005/0216434 | A1* | 9/2005 | Haveliwala | G06F 16/9535 |
| 2006/0149558 | A1* | 7/2006 | Kahn | G10L 15/063 |
| | | | | 704/278 |
| 2006/0227240 | A1 | 10/2006 | Chiu et al. | |
| 2006/0253280 | A1* | 11/2006 | Harband | G10L 13/00 |
| | | | | 704/223 |
| 2008/0052061 | A1 | 2/2008 | Kim et al. | |
| 2009/0244372 | A1 | 10/2009 | Petronelli et al. | |
| 2010/0118189 | A1 | 5/2010 | Ayoub et al. | |
| 2011/0283243 | A1 | 11/2011 | Eckhardt et al. | |
| 2012/0275761 | A1 | 11/2012 | Li et al. | |
| 2015/0042771 | A1* | 2/2015 | Jensen | H04N 13/398 |
| | | | | 348/54 |
| 2015/0340034 | A1* | 11/2015 | Schalkwyk | G06N 3/02 |
| | | | | 704/235 |
| 2016/0014476 | A1 | 1/2016 | Caliendo, Jr. et al. | |
| 2016/0110341 | A1* | 4/2016 | Chuang | G06F 40/129 |
| | | | | 704/8 |
| 2016/0148611 | A1 | 5/2016 | Kim et al. | |
| 2016/0180215 | A1* | 6/2016 | Vinyals | G06N 3/045 |
| | | | | 706/20 |
| 2017/0011046 | A1* | 1/2017 | Kapoor | G06F 16/148 |
| 2017/0032779 | A1 | 2/2017 | Ahn et al. | |
| 2017/0316708 | A1 | 11/2017 | Harb et al. | |
| 2017/0358302 | A1* | 12/2017 | Orr | G06F 16/435 |
| 2018/0220195 | A1 | 8/2018 | Panchaksharaiah et al. | |
| 2018/0267955 | A1* | 9/2018 | Catalano | H04W 4/14 |
| 2019/0139550 | A1* | 5/2019 | Church | G10L 15/26 |
| 2020/0007946 | A1* | 1/2020 | Olkha | G06F 40/263 |
| 2020/0097952 | A1* | 3/2020 | Piparsaniya | G06F 3/167 |
| 2020/0135225 | A1* | 4/2020 | Vaughn | H04N 21/25891 |
| 2020/0196022 | A1* | 6/2020 | Sen | G06F 40/247 |
| 2021/0335354 | A1* | 10/2021 | Park | G10L 15/063 |
| 2024/0045790 | A1* | 2/2024 | Bussa | G06F 11/368 |
| 2024/0045904 | A1* | 2/2024 | Tiwari | H04N 21/44008 |

OTHER PUBLICATIONS

Examination report dated Feb. 5, 2021, in connection with Indian Application No. 201911020003, 6 pages.

* cited by examiner

| User | Origin Of User | Word | Word Language | Frequency of word used/day | Contextual Profile |
|---|---|---|---|---|---|
| User1 | Indian | Happy | English | 30 | Profile 1 |
| User1 | Indian | Healthy | English | 5 | Profile 1 |
| User2 | Chinese | scoffs | English | 0.5 | Profile 1 |
| User2 | Chinese | assure | English | 2 | Profile 1 |
| User3 | Korean | inoculations | English | 1 | Profile 1 |
| User3 | Korean | Cold feet | English/Idiom | 0.1 | Profile 1 |
| User3 | Korean | Derp | English/Slang | 2 | Profile 1 |
| User5 | British | avec | French | 24 | Profile 1 |
| User5 | British | bien | French | 12 | Profile 1 |
| User6 | American | faudra | French | 3 | Profile 1 |
| User3 | Korean | cacher | French | 0.4 | Profile 2 |
| User3 | Korean | marignane | French | 0.1 | Profile 2 |
| User6 | American | Balle | French/Slang | 2 | Profile 2 |
| User9 | Japanese | Avoir le cafard | French/Idiom | 1 | Profile 1 |
| User1 | Indian | dónde | Spanish | 16 | Profile 2 |
| User3 | Korean | también | Spanish | 12 | Profile 2 |
| User5 | British | elegir | Spanish | 6 | Profile 1 |
| User1 | Indian | lider | Spanish | 4 | Profile 2 |
| User3 | Korean | conquistado | Spanish | 0.4 | Profile 2 |
| User1 | Indian | Ser pan comido | Spanish/Idiom | 1.2 | Profile 2 |

FIG. 7

TEXT RECONSTRUCTION SYSTEM AND METHOD THEREOF

CROSS-REFERENCE TO RELATED APPLICATIONS

This application is a 371 National Stage of International Application No. PCT/KR2020/006517, filed May 19, 2020, which claims priority to Indian Patent Application No. 201911020003, filed May 20, 2019, the disclosures of which are herein incorporated by reference in their entirety.

BACKGROUND

1. Field

The present invention relates generally to electronic systems, and, particularly but not exclusively, to a system and a method for text reconstruction.

2. Description of Related Art

Increasing use of smart devices, such as smartphones, tablets, smart watches, etc. has resulted in a huge increase in data consumption. A large portion of the data consumed by users of the smart devices is multimedia content. For instance, a large number of users watch movies, television series, anime, sports matches, reality shows, live television etc. on their smart devices. This content is made available in many languages and different dialects of the languages. Since the users may not be well versed with all the languages, media providers and broadcasters provide closed captions or subtitles for the media content. The subtitles are available in all languages and the users may select the language of subtitles of their choice while retaining the original audio. The subtitles are also useful for hearing impaired persons to follow the multimedia content.

Subtitles may have long sentences based on the dialogues of the multimedia content. It is generally observed that reading such long sentences in such a short time is only achievable for people having high reading skills. For people having low or minimum reading skills, it is difficult to read the entire subtitles and to follow the video simultaneously. This dampens the experience of watching the multimedia content.

Even when the user selects the subtitle in a language that he/she knows, it may still be difficult to follow the subtitles because of the level of understanding of the language. For instance, a user who is proficient in English may read and understand the subtitles whereas a user who is a novice in English may find it difficult to read and understand difficult words used in the subtitles. Unfamiliar vocabulary and difference in dialects makes it difficult for the users to read and understand the subtitles and to follow the video simultaneously. The major problems of the existing subtitles are described below:

When the words used in the subtitles are not familiar to all the users, one user may understand the subtitles and other user may tend to lose the interest content when the difficulty level of the words is more than he/she can manage to understand. For instance, in the subtitle "God, I hope he doesn't turn out to be a shmuck like the others.", the term "turn out to be a shmuck" might be unfamiliar to most of the users. Hence, the users may not understand the meaning of this subtitle completely.

Use of idioms and phrases in subtitles further increases the complexity of the subtitles. the idioms carry a different meaning than the dictionary meaning. This makes it even more difficult for the users to understand the subtitles. For instance, in the subtitle "I'm, like, really low-key annoyed.", the slang "low-key" is used along with "annoyed" which may be difficult for the users to grasp.

A subtitle having a greater number of words is even more difficult to read in the short time. An average adult reading speed in subtitles is 15-20 characters per second and 30-40 characters per line in the subtitles. In complex subtitles, for instance, in a scene having a subtitle "I know you can be overwhelmed and you can be underwhelmed, but can you ever just be whelmed? I think you can in Europe.", the readability is lost as the number of characters in the subtitle is more than the average readability rate.

Subtitles having a foreign accent are also difficult to understand. For instance, in the subtitle "Since the moment of conception. How breathtakingly prescient of her.", the use of British accent would be difficult to understand.

Further, in case of multiple users, when a group of users are viewing the multimedia at the same time, a few users may be proficient in the language whereas the others might not be so. In such a situation, the user having lowest level of understanding may pause or rewind the multimedia content to read and fully understand the subtitles. For instance, when four users are viewing a scene having the subtitle "She recently became a catechist in our confraternity.", the first user may understand the meaning of both, "catechist" and "confraternity". The second user may understand the meaning of "catechist" but not the meaning of "confraternity". The third user may understand the meaning of "confraternity" but not the meaning of "catechist". The fourth user may not understand the meaning of both, "catechist" and "confraternity". In this case, the first user may fully understand the meaning of the subtitle and the displayed scene. However, the fourth user may not understand the meaning of the subtitle and may pause or rewind the multimedia to look-up the meaning of the words. This may cause annoyance to the first user as he/she is interrupted unnecessarily.

In certain types of multimedia content like documentaries etc. jargon may be used. Such jargon may be understood by the professionals in that field, but not by others. For instance, the following subtitle occurring in scene "Several taps might cause artery spasm and clot in small vessels of the brain and this would cause small strokes in the same area." may be difficult to understand because of use of jargon like "artery", "spasm", etc.

In a conventional system for providing word definitions based on user exposure, the system provides definition of words to the user. The system checks the minimum word length and the history of the words encountered by the user. Based on the above, the system pauses the multimedia when providing definition of the word to the user.

In another conventional system, the system automatically enables subtitles based on detection of an accent. The system provides facility to enable or disable the subtitles. The system checks the user's understanding of the accent. The system focuses on parameters such as facial expressions and accordingly provides rewinding or pausing the multimedia, etc.

In yet another conventional closed captioning system, the system checks the audibility of the multimedia and accordingly enables and disables the closed captions.

In yet another conventional closed captioning system, the system provides two subtitles: one in native language and other in source language. The system provides definition of words to the user and pauses the multimedia while providing the definition to the user.

However, the aforementioned conventional systems have many drawbacks, some of which are discussed below:

Some conventional systems depend on the user's input. Here, the user is required to interrupt the multimedia and select the word from the subtitle to receive the definition. This is undesirable as it interrupts the flow of the multimedia and may cause the user to lose interest in the multimedia because of the interruptions.

Some conventional systems capture the user's exposure to similar content and try to predict if the subtitle is understandable or not. If the subtitle is not understandable, the system provides the definitions of the difficult words. However, the user being exposed to similar content does not necessarily mean that the user follows such words.

Some conventional systems focus on audibility of the subtitles and not on the content of the subtitles. Similarly, some conventional systems change the position of the subtitles on the screen to improve readability This does not provide a proper solution because even the audible subtitles may not be understandable because of the difficulty.

Furthermore, the conventional systems fail to take into consideration the user's own dialect, the average readability rate of the user, the user's familiarity with the words. The conventional systems also interrupt the multimedia and require the user to provide input, this breaking the flow of the multimedia.

Therefore, there is a need for an effective text reconstruction system that addresses at least one of the problems faced by the conventional systems.

SUMMARY

Based on the discussion as described above, the disclosure provides a system and a method for delivering personalized subtitles and closed captions.

This summary is provided to introduce concepts related to text reconstruction. This summary is neither intended to identify essential features of the present invention nor is it intended for use in determining or limiting the scope of the present invention.

In an embodiment of the present invention, a text reconstruction method for reconstructing a primary text data is provided. The text reconstruction method includes receiving a textual data and a voice input signal corresponding to a user at a processing module. The voice input signal is converted into an input text data by a speech recognition module. The text classifier module generates one or more tokens based on the input text data and the textual data. The text classifier module adds the tokens into a word bag corresponding to the user. The text identifier module generates a text corpus based on the input text data. A user profile builder module creates a user profile based on the word bag, the input text data, and the text corpus. A decision module determines, based on the word bag, whether the primary data is to be reconstructed. The text reconstruction module reconstructs the primary text data to generate a personalized text data based on the user profile, when the decision module determines that the primary text data is to be reconstructed.

In another embodiment of the present invention, a text reconstruction system is provided. The text reconstruction system includes a processing module, a speech recognition module, a text classifier module, a text identifier module, a decision module, a user profile builder module, and a text reconstruction module. The processing module receives a textual data and a voice input signal corresponding to a user. The speech recognition module converts the voice input signal into an input text data. The text classifier module generates one or more tokens based on the input text data and the textual data. The text classifier module adds the tokens into a word bag corresponding to the user. The text identifier module generates a text corpus based on the input text data. the decision module determines, based on the word bag, whether the primary text data is to be reconstructed. The user profile builder module creates a user profile based on the word bag, the input text data, and the text corpus. The text reconstruction module reconstructs the primary text data to generate a personalized text data based on the user profile when the decision module determines that the primary text data is to be reconstructed.

In an exemplary embodiment, the tokens include one or more of: words spoken by the user, phrases spoken by the user, idioms spoken by the user, and jargon, slang, or dialect of the user.

In another exemplary embodiment, the word bag includes: the tokens, and one or more of following labels corresponding to the tokens: language of the token, contextual profile corresponding to the token, and frequency of use of the token by the user.

In another exemplary embodiment, the text corpus includes: input text data, and one or more of: translations of the input text data into other languages, paraphrases of the input text data, paraphrases of said translations, and contextual labels corresponding to the input text data.

In another exemplary embodiment, the text reconstruction module is trained for reconstructing the primary text data based on the text corpus.

In another exemplary embodiment, the speech recognition module includes a feature extraction system and a decoder. The feature extraction system extracts one or more acoustic features from the voice input signal to generate a feature vector. The decoder decodes the feature vector based on a lexicon to detect one or more words spoken by the user and generates the input text data based on the detected words and sentences.

In another exemplary embodiment, the text classifier module identifies one or more languages of the words and sentences in the input text data and classifies the words and sentences in the input text data. The text classifier module labels the classified words and sentences with the corresponding languages and generate the tokens based on the classified words and sentences and the corresponding labels.

In another exemplary embodiment, the text identifier module includes a translator, a paraphraser, and a natural language processing unit. The translator translates the sentences in the input text data into one or more other languages to generate one or more translated sentences. The paraphraser paraphrases the translated sentences to generate one or more paraphrased sentences. The natural language processing unit translates the paraphrased sentences to generate one or more translated paraphrased sentences. The natural language processing unit tags the translated sentences, the paraphrased sentences, and the translated paraphrased sentences with the input text data. The natural language processing unit generates the text corpus including the input text data and the tagged translated sentences, paraphrased sentences, and translated paraphrased sentences corresponding to the input text data.

In another exemplary embodiment, the decision module extracts the words and phrases from the primary text data and looks up for said extracted words and phrases in the tokens in the word bag. The decision module determines that the primary text data is to be reconstructed when the lookup is below a predefined threshold of lookup.

In another exemplary embodiment, the decision module computes a number of characters in the primary text data, and determines that the primary text data is to be reconstructed when the computed number of characters is more than a predefined threshold of characters.

In another exemplary embodiment, the decision module extracts words and phrases from the primary text data and search for frequently used words and phrases in the word bag. The frequently used words and phrases correspond to the extracted words and phrases. The decision module determines that the primary text data is to be reconstructed on finding said frequently used words and phrases in the word bag.

In another exemplary embodiment, a context identifier module receives the voice input signal and one or more sensory signals and determines a context based on the voice input signal and the received sensory signals. The context is indicative of surrounding environment of the user, presence of other people in vicinity of the user, location of the user, and other contextual factors.

In another embodiment, the text reconstruction module reconstructs the primary text data based on the determined context.

In another embodiment, the primary text data is one of: media subtitles, virtual assistant output, and a machine generated text data.

In another exemplary embodiment, the textual data includes textual communication and social network interaction of the user.

Various embodiments of the present disclosure provide a system and method for delivering personalized subtitles and closed captions.

BRIEF DESCRIPTION OF THE DRAWINGS

The detailed description is described with reference to the accompanying figures. The same numbers are used throughout the drawings to reference like features and modules.

FIG. 7 shows an example of a word bag in accordance with another embodiment of the present invention.

Figure 1:
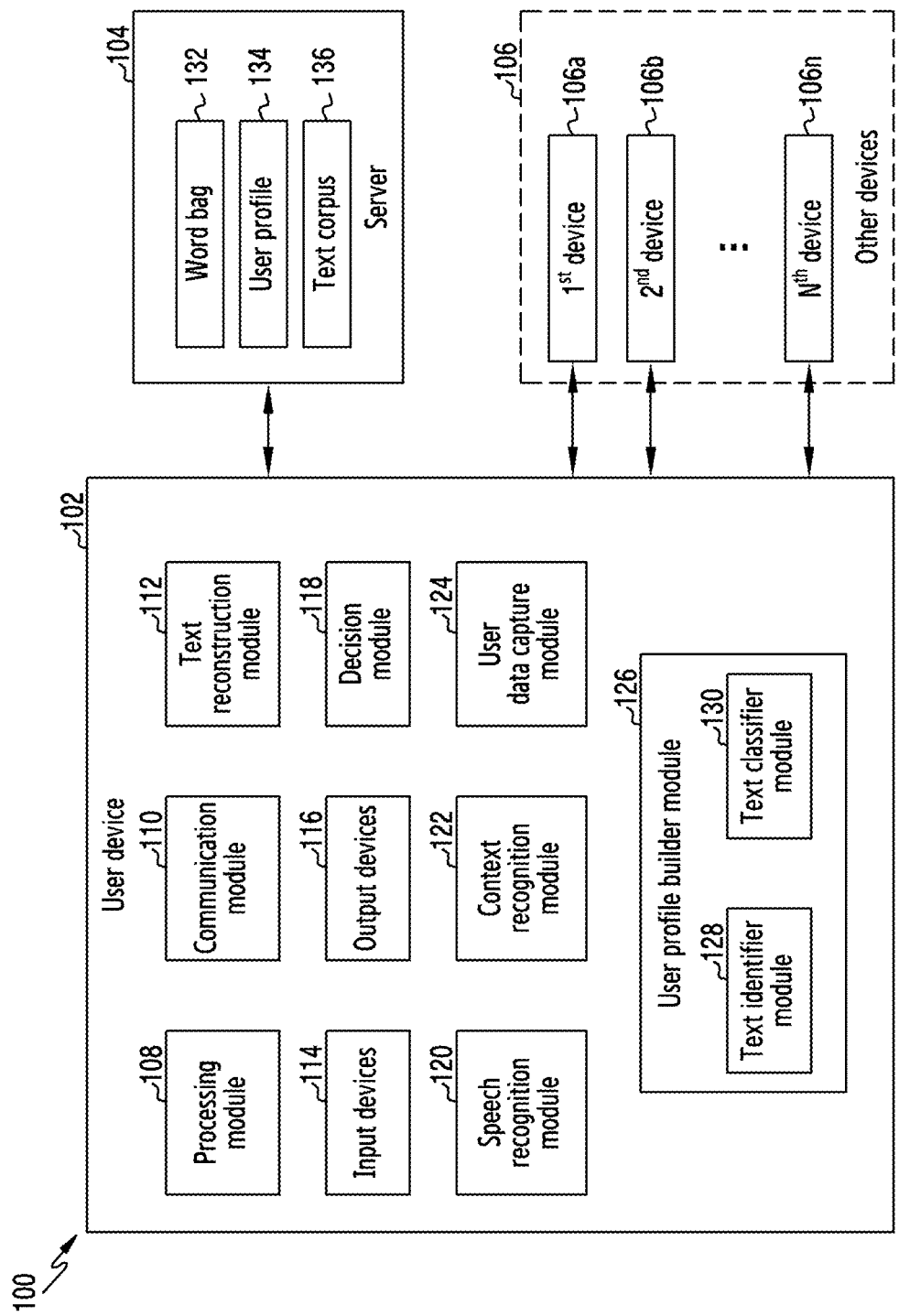
FIG. 1 shows a schematic block diagram of a text reconstruction system in accordance with an embodiment of the present invention.

It should be appreciated by those skilled in the art that any block diagrams herein represent conceptual views of illustrative systems embodying the principles of the present invention.

Similarly, it will be appreciated that any flowcharts, flow diagrams, and the like represent various processes which may be substantially represented in computer readable medium and so executed by a computer or processor, whether or not such computer or processor is explicitly shown.

DETAILED DESCRIPTION

In the following description, for the purpose of explanation, specific details are set forth in order to provide an understanding of the present invention. It will be apparent, however, to one skilled in the art that the present invention may be practiced without these details. One skilled in the art will recognize that embodiments of the present invention, some of which are described below, may be incorporated into a number of systems.

Furthermore, connections between components and/or modules within the figures are not intended to be limited to direct connections. Rather, these components and modules may be modified, re-formatted or otherwise changed by intermediary components and modules.

References in the present invention to "one embodiment" or "an embodiment" mean that a particular feature, structure, characteristic, or function described in connection with the embodiment is included in at least one embodiment of the invention. The appearances of the phrase "in one embodiment" in various places in the specification are not necessarily all referring to the same embodiment.

The various embodiments of the present invention provide a system and a method for text reconstruction.

In an embodiment of the present invention, a text reconstruction method for reconstructing a primary text data is provided. The text reconstruction method includes receiving a textual data and a voice input signal corresponding to a user at a processing module. The voice input signal is converted into an input text data by a speech recognition module. The text classifier module generates one or more tokens based on the input text data and the textual data. The text classifier module adds the tokens into a word bag corresponding to the user. The text identifier module generates a text corpus based on the input text data. A user profile builder module creates a user profile based on the word bag, the input text data, and the text corpus. A decision module determines, based on the word bag, whether the primary data is to be reconstructed. The text reconstruction module reconstructs the primary text data to generate a personalized text data based on the user profile, when the decision module determines that the primary text data is to be reconstructed.

In another embodiment of the present invention, a text reconstruction system is provided. The text reconstruction system includes a processing module, a speech recognition module, a text classifier module, a text identifier module, a decision module, a user profile builder module, and a text reconstruction module. The processing module receives a textual data and a voice input signal corresponding to a user.

The speech recognition module converts the voice input signal into an input text data. The text classifier module generates one or more tokens based on the input text data and the textual data. The text classifier module adds the tokens into a word bag corresponding to the user. The text identifier module generates a text corpus based on the input text data. the decision module determines, based on the word bag, whether the primary text data is to be reconstructed. The user profile builder module creates a user profile based on the word bag, the input text data, and the text corpus. The text reconstruction module reconstructs the primary text data to generate a personalized text data based on the user profile when the decision module determines that the primary text data is to be reconstructed.

The tokens include one or more of: words spoken by the user, phrases spoken by the user, idioms spoken by the user, and jargon, slang, or dialect of the user. The word bag includes: the tokens, and one or more of following labels corresponding to the tokens: language of the token, contextual profile corresponding to the token, and frequency of use of the token by the user. The text corpus includes: input text data, and one or more of: translations of the input text data into other languages, paraphrases of the input text data, paraphrases of said translations, and contextual labels corresponding to the input text data.

The text reconstruction module is trained for reconstructing the primary text data based on the text corpus.

The speech recognition module includes a feature extraction system and a decoder. The feature extraction system extracts one or more acoustic features from the voice input signal to generate a feature vector. The decoder decodes the feature vector based on a lexicon to detect one or more words spoken by the user and generates the input text data based on the detected words and sentences.

The text classifier module identifies one or more languages of the words and sentences in the input text data and classifies the words and sentences in the input text data. The text classifier module labels the classified words and sentences with the corresponding languages and generate the tokens based on the classified words and sentences and the corresponding labels.

The text identifier module includes a translator, a paraphraser, and a natural language processing unit. The translator translates the sentences in the input text data into one or more other languages to generate one or more translated sentences. The paraphraser paraphrases the translated sentences to generate one or more paraphrased sentences. The natural language processing unit translates the paraphrased sentences to generate one or more translated paraphrased sentences. The natural language processing unit tags the translated sentences, the paraphrased sentences, and the translated paraphrased sentences with the input text data. The natural language processing unit generates the text corpus including the input text data and the tagged translated sentences, paraphrased sentences, and translated paraphrased sentences corresponding to the input text data.

In an example, the decision module extracts the words and phrases from the primary text data and looks up for said extracted words and phrases in the tokens in the word bag. The decision module determines that the primary text data is to be reconstructed when the lookup is below a predefined threshold of lookup. In another example, the decision module computes a number of characters in the primary text data, and determines that the primary text data is to be reconstructed when the computed number of characters is more than a predefined threshold of characters. In yet another example, the decision module extracts words and phrases from the primary text data and search for frequently used words and phrases in the word bag. The frequently used words and phrases correspond to the extracted words and phrases. The decision module determines that the primary text data is to be reconstructed on finding said frequently used words and phrases in the word bag.

A context identifier module receives the voice input signal and one or more sensory signals and determines a context based on the voice input signal and the received sensory signals. The context is indicative of surrounding environment of the user, presence of other people in vicinity of the user, location of the user, and other contextual factors.

The text reconstruction module reconstructs the primary text data based on the determined context. The primary text data is one of: media subtitles, virtual assistant output, and a machine generated text data. The textual data includes textual communication and social network interaction of the user.

Referring now to FIG. 1, a schematic block diagram of a text reconstruction system (100) for reconstructing a primary text data is shown in accordance with an embodiment of the present invention. The text reconstruction system (100) includes a user device (102), a server (104), and a plurality of other devices (106). The user device (102) includes a processing module (108), a communication module (110), a text reconstruction module (112), one or more input devices (114), one or more output devices (116), a decision module (118), a speech recognition module (120), a context recognition module (122), a user data capture module (124), and a user profile builder module (126). The user profile builder module (126) includes a text identifier module (128) and a text classifier module (130). The server (104) includes a word bag (132), a user profile (134), and a text corpus (136).

In an embodiment, the text reconstruction system (100) depicts an on-device implementation of the present invention.

Figure 2:
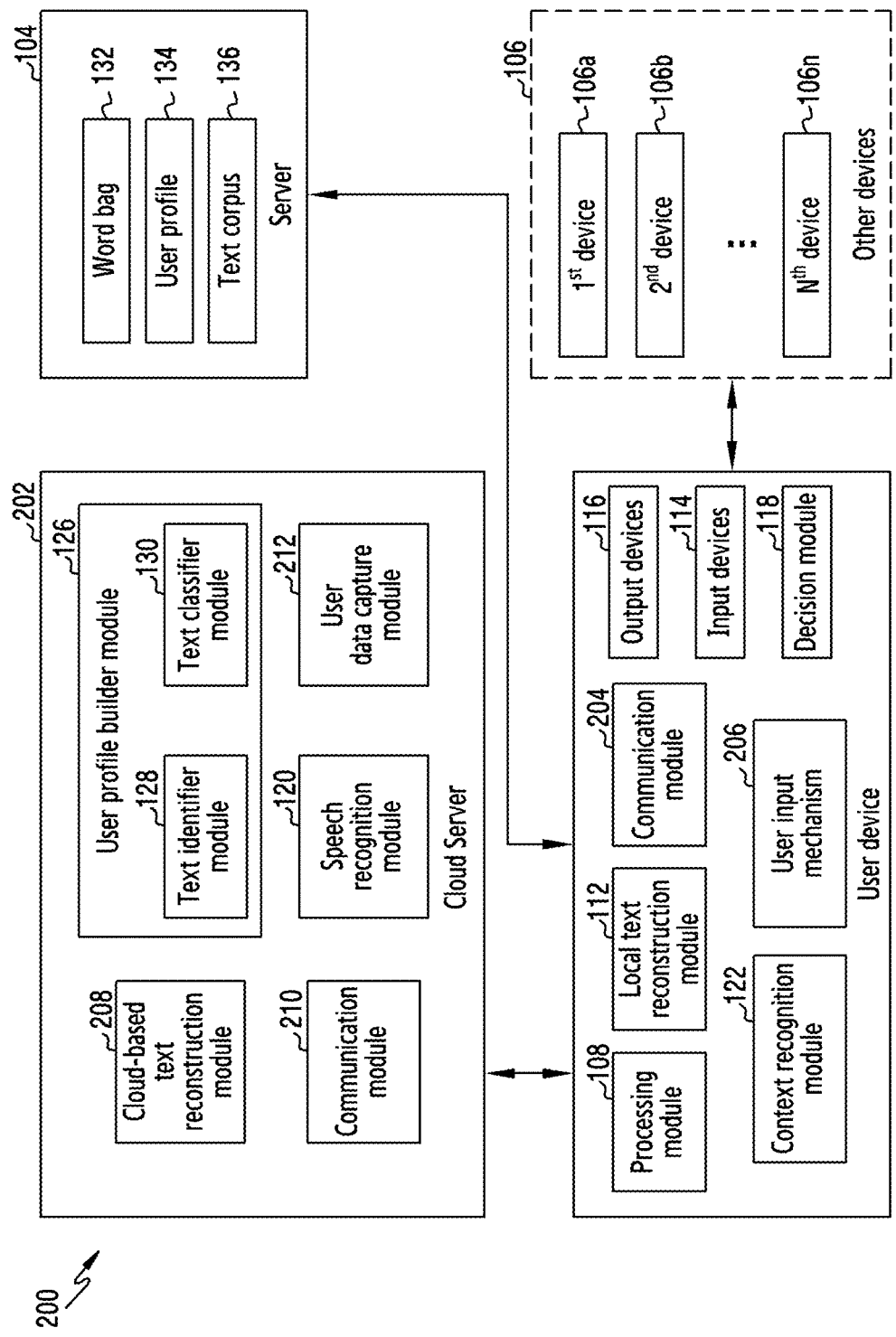
FIG. 2 shows a schematic block diagram of a text reconstruction system in accordance with another embodiment of the present invention.

Referring now to FIG. 2, a schematic block diagram of a text reconstruction system (200) for reconstructing a primary text data is shown in accordance with an embodiment of the present invention. The text reconstruction system (200) includes a user device (102), a server (104), a cloud server (202), and a plurality of other devices (106). The user device (102) includes a processing module (108), a local text reconstruction module (112), a communication module (204), one or more output devices (116), one or more input devices (114), a decision module (118), a user input mechanism (206), and a context recognition module (122). The cloud server (202) includes a cloud-based text reconstruction module (208), a user profile builder module (126), a communication module (210), a speech recognition module (120), and a user data capture module (212). The user profile builder module (126) includes a text identifier module (128) and a text classifier module (130). The server (104) includes a word bag (132), a user profile (134), and a text corpus (136).

In an embodiment, the text reconstruction system (200) depicts a cloud-based implementation of the present invention.

The text reconstruction system (200), although structurally different, is functionally similar to the text reconstruction system (100). For simplicity, the present invention is described below with respect to the text reconstruction system (100). However, it should be noted that the present invention is not limited to the arrangements depicted in FIG. 1 and FIG. 2, i.e., the present invention can be implemented by various other arrangements. For example, the server (104) and the cloud server (202) may be implemented within a single server or may be implemented in a distributive manner on different servers. Also, the text reconstruction method may be implemented locally or on one or more cloud servers.

The user device (102) corresponds to a user. Examples of the user device (102) include electronic devices like television, display screen, tablet, smartphone, laptop, desktop etc. The user device (102) is in communication with the other devices (106) by way of wired or wireless communication networks. Examples of the other devices (106) include smartphones, tablets, etc. In an example, the other devices (106) also correspond to the user. In another example, the user device (102) and the other devices (106) are linked to same user account.

The processing module (108) of the user device (102) may include a microprocessor or a microcontroller and may include memory storing machine executable instructions. The processing module (108) receives a textual data and a voice input signal. In an example, the voice input signal is the user's voice. The user's voice may be captured by the user device (102) or one of the other devices (106). In the user device (102), the input devices (114) such as microphones may capture the user's voice. The textual data may include textual communication of the user, such as, the SMSs, MMSs, or IMs sent by the user through the user account. The textual data may also include the user's social media activity, such as, textual posts and shares of the user on social networking websites.

The speech recognition module (120) receives the voice input signal and converts the voice input signal into an input text data. The input text data is machine readable text information spoken by the user. In an example, the input text data includes words or sentences spoken by the user. The speech recognition module (120) sends the input text data to the text classifier module (130).

The text classifier module (130) receives the input text data from the speech recognition module (120) and generates one or more tokens based on the input text data. The tokens include the words, phrases, idioms, jargon, slang, or dialect of the user. In an example, the tokens indicate characteristics of the user's may of speaking. For instance, when two users speak different dialects of English, although the words spoken by the users are same, the dialect is different. This information about the difference in the dialects is captured in the tokens generated by the text classifier module (130). After generation of the tokens, the text classifier module (130) adds the tokens to a word bag corresponding to the user. In case of multiple users, the text classifier module (130) adds the tokens to the word bags of the corresponding users.

The text identifier module (128) generates a text corpus based on the input text data. In that, the text identifier module (128) translates the input text data into different languages to generate and store translated input text data. The text identifier module (128) paraphrases the input text data to generate and store paraphrased input text data. The text identifier module (128) paraphrases the translations of the input text data to generate and store paraphrased translated input text data. The text identifier module (128) also stores contextual labels of the input text data. The text corpus is used to train the text reconstruction module (112) in reconstructing the primary text data.

The decision module (118) determines whether the primary text data is to be reconstructed or not. This decision may be performed by the decision module (118) based on various decisive factors.

In an example, the decision module (118) extracts words and phrases from the primary text data. The decision module (118) looks up for the extracted words and phrases in the tokens within the word bag of the corresponding user. If the decision module (118) finds that the look-up is below a predefined threshold, i.e., the words or phrases in the primary text data are not within the word bag of the user, the decision module (118) determines that the primary text data requires reconstruction.

In another example, the decision module (118) computes a number of characters in the primary text data and compares the number with a predefined number of characters. For instance, the predefined number of characters may correspond to average readability rate of a person. If the decision module (118) finds that the number is greater than the predefined number of characters, the decision module (118) determines that the primary text data requires reconstruction.

In another example, the decision module (118) extracts the words and phrases from the primary text data and searches for the extracted words and phrases in the frequently used words and phrases in the word bag of the corresponding user. If the extracted words and phrases are not found within the frequently used words and phrases within the word bag, the decision module (118) determines that the primary text data is to be reconstructed.

The user profile builder module (126) creates a user profile for the user based on the word bag, the input text data, and the text corpus. The user profile corresponds to the user and is used for personalizing the text reconstruction for the user.

When the decision module (118) determines that the primary text data is to be reconstructed, the text reconstruction module (112) reconstructs the primary text data to generate a personalized text data based on the user profile. The personalized text data is personalized for the user and hence, is easily read and understood by the user unlike the primary text data.

In the text reconstruction system (200), the cloud server is in communication with the user device (102). The user device (102) is in communication with the other devices (106).

At the user device (102), the processing module (108) receives a textual data and a voice input signal. The user device (102) transmits the textual data and the voice input signal to the cloud server (202).

At the cloud server (202), the speech recognition module (120) converts the voice input signal into an input text data. The speech recognition module (120) sends the input text data to the text classifier module (130). The text classifier module (130) receives the input text data from the speech recognition module (120) and generates one or more tokens based on the input text data. The text identifier module (128) generates a text corpus based on the input text data.

Hence, in the text reconstruction system (200), the steps of generating the tokens and the text corpus are performed at the cloud server (202) whereas in the text reconstruction system (100), the steps of generating the tokens and the text corpus are performed at the user device (102).

Figure 3:
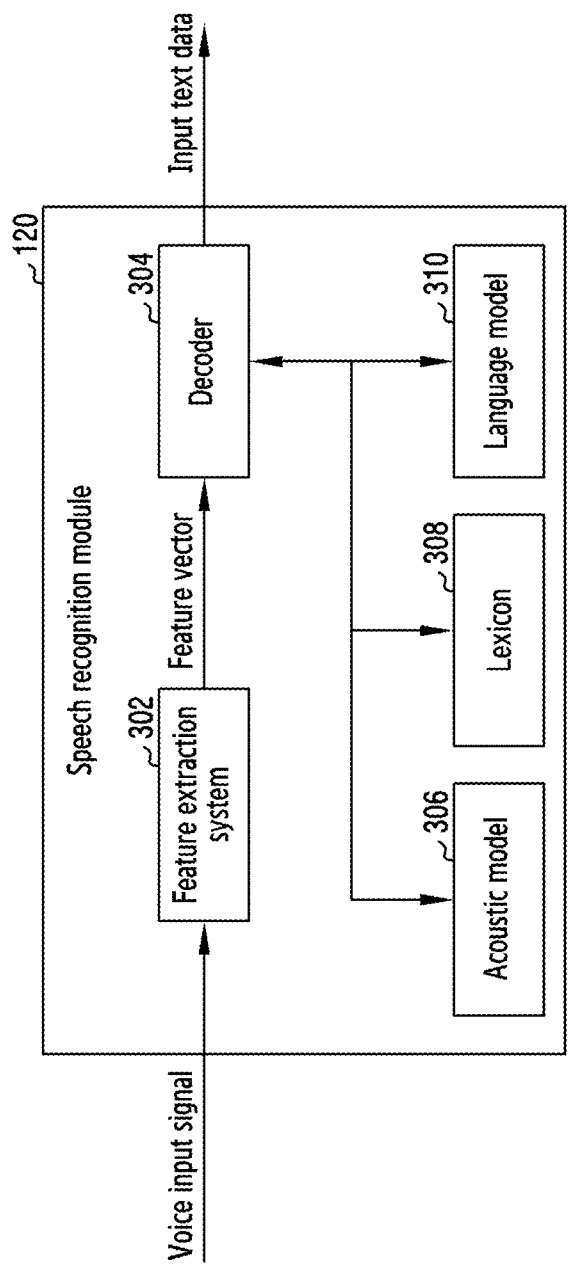
FIG. 3 shows a schematic block diagram of a speech recognition module in accordance with another embodiment of the present invention.

Referring now to FIG. 3, a schematic block diagram of the speech recognition module (120) is shown in accordance with an embodiment of the present invention. The speech recognition module (120) includes a feature extraction system (302), a decoder (304), an acoustic model (306), a lexicon (308), and a language model (310).

The feature extraction system (302) extracts one or more acoustic features from the voice input signal to generate a feature vector. The feature vector is indicative of the acoustic characteristics of the voice input signal. The decoder (304) decodes the feature vector based on the lexicon (308) to detect the words spoken by the user. Thereafter, the decoder (304) generates the input text data based on the detected words and sentences.

The acoustic model (306) extracts the acoustically relevant parameters such as energy, spectral features, and pitch information from the feature vector. The lexicon (308) is used by the decoder (304) for converting sub-word phone sequences into words. The lexicon (308) includes a database of words. The language model (310) recognizes the words based on most significant word combinations at sentence level. The acoustic model (306), the lexicon (308), and the language model (310) together form perform a natural language processing method. The decoder (304) computes the best match between a spoken utterance and a corresponding word to generate the input text data.

In an embodiment, the speech recognition module (120) also includes an automatic speech recognition system for recognizing the user's voice and a noise suppression system that suppresses noise.

Figure 4A:
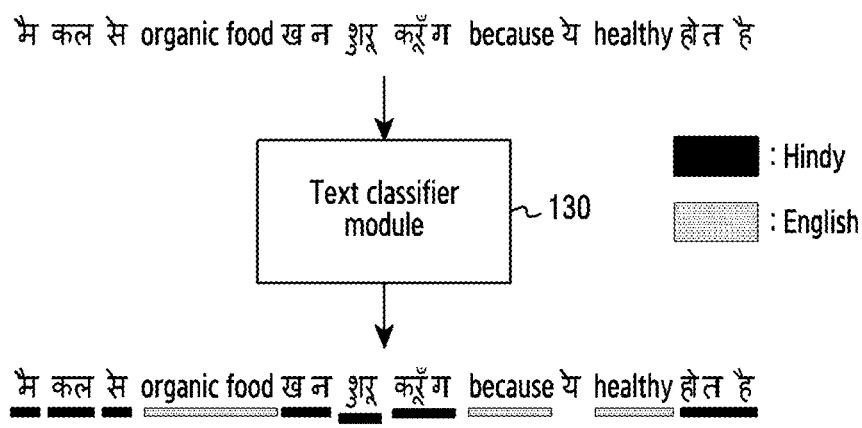
FIGS. 4A-4B show a schematic representation of an operation of a text classifier module in accordance with another embodiment of the present invention.
Figure 4B:
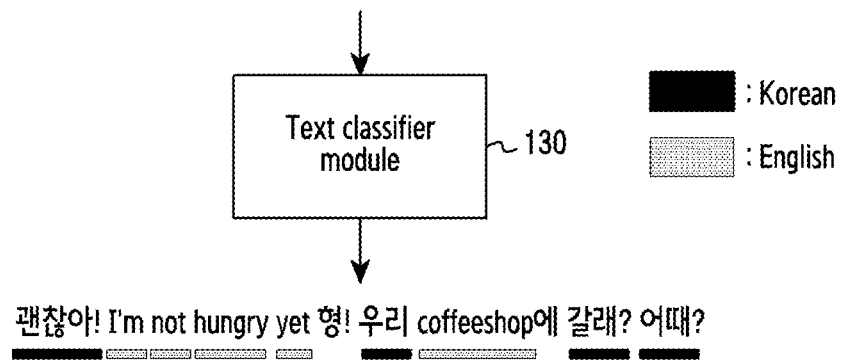

Referring now to FIGS. 4A-4B, a schematic representation of an operation of the text classifier module (130) is shown in accordance with an embodiment of the present invention.

As shown in FIG. 4A, the text classifier module (130) receives a bilingual sentence in English and Hindi. The text classifier module (130) identifies the Hindi words and English words. The text classifier module (130) tags the identified words with the language of the words.

Similarly, in FIG. 4B, the text classifier module (130) receives a sentence in English and Korean. The text classifier module (130) classifies the words in Korean and English.

Figure 5:
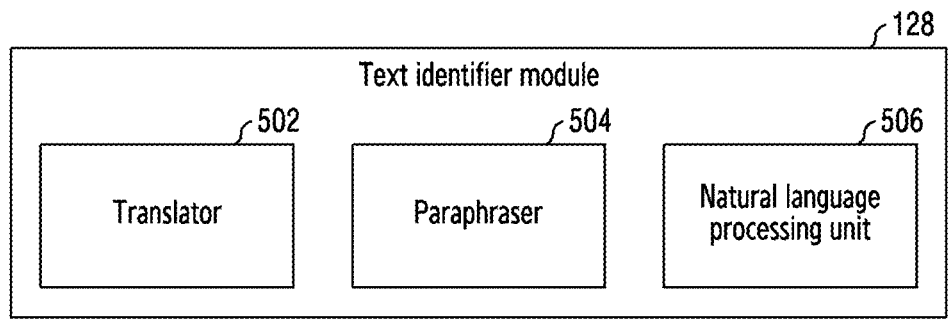
FIG. 5 shows a schematic block diagram of a text identifier module in accordance with another embodiment of the present invention.

Referring now to FIG. 5, a schematic block diagram of the text identifier module (128) is shown in accordance with an embodiment of the present invention. The text identifier module (128) includes a translator (502), a paraphraser (504), and a natural language processing unit (506).

The translator (502) translates the sentences in the input text data into one or more other languages to generate one or more translated sentences. The paraphraser (504) paraphrases the sentences in the input text data to generate one or more paraphrased sentences. The natural language processing unit (506) translates the paraphrased sentences to generate one or more translated paraphrased sentences. The natural language processing unit (506) tags the translated sentences, the paraphrased sentences, and the translated paraphrased sentences with the input text data. The natural language processing unit (506) generates the text corpus including the input text data and the tagged translated sentences, paraphrased sentences, and translated paraphrased sentences corresponding to the input text data.

Figure 6A:
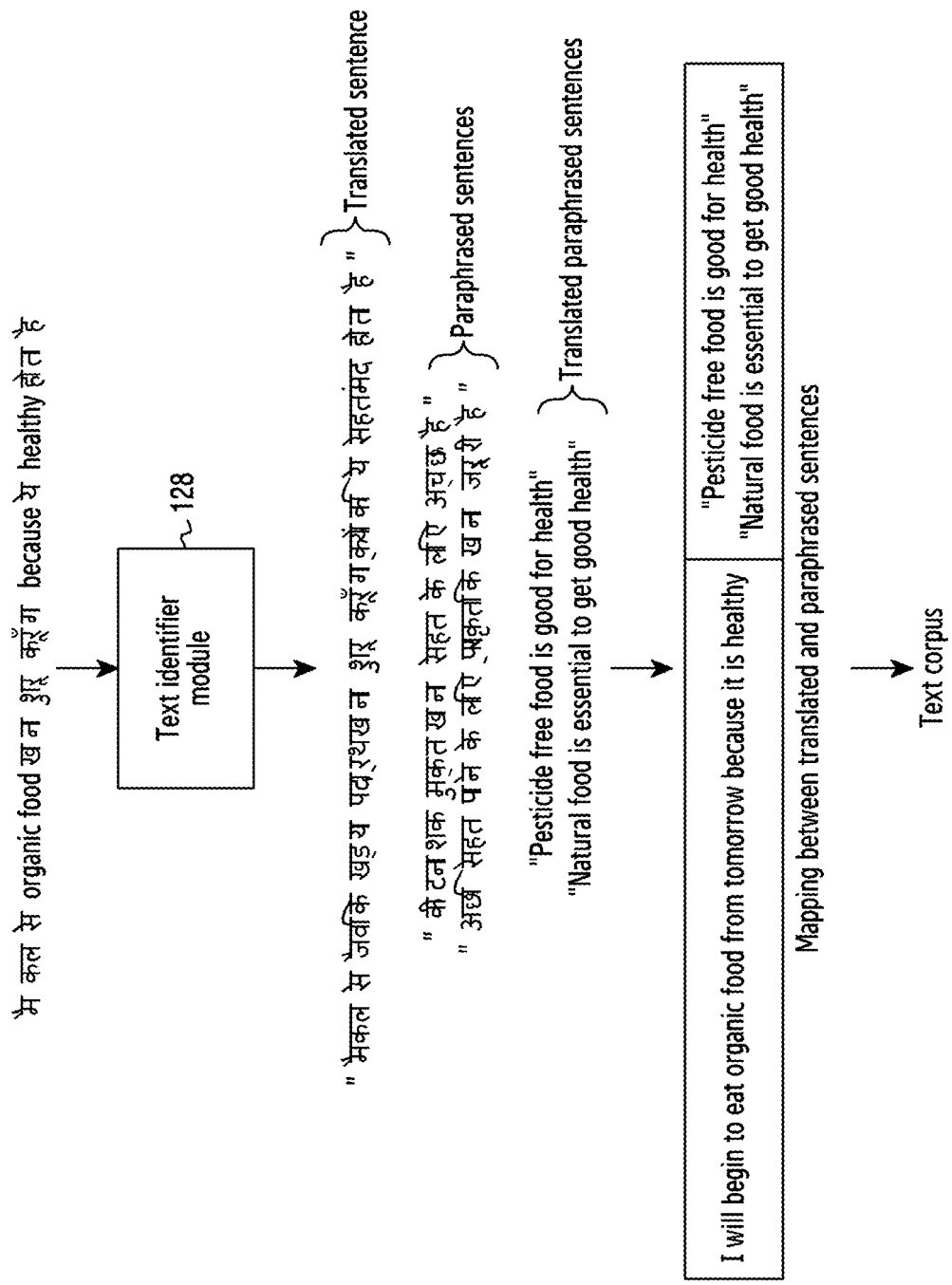
FIGS. 6A-6B show a schematic representation of an operation of a text identifier module in accordance with another embodiment of the present invention.
Figure 6B:
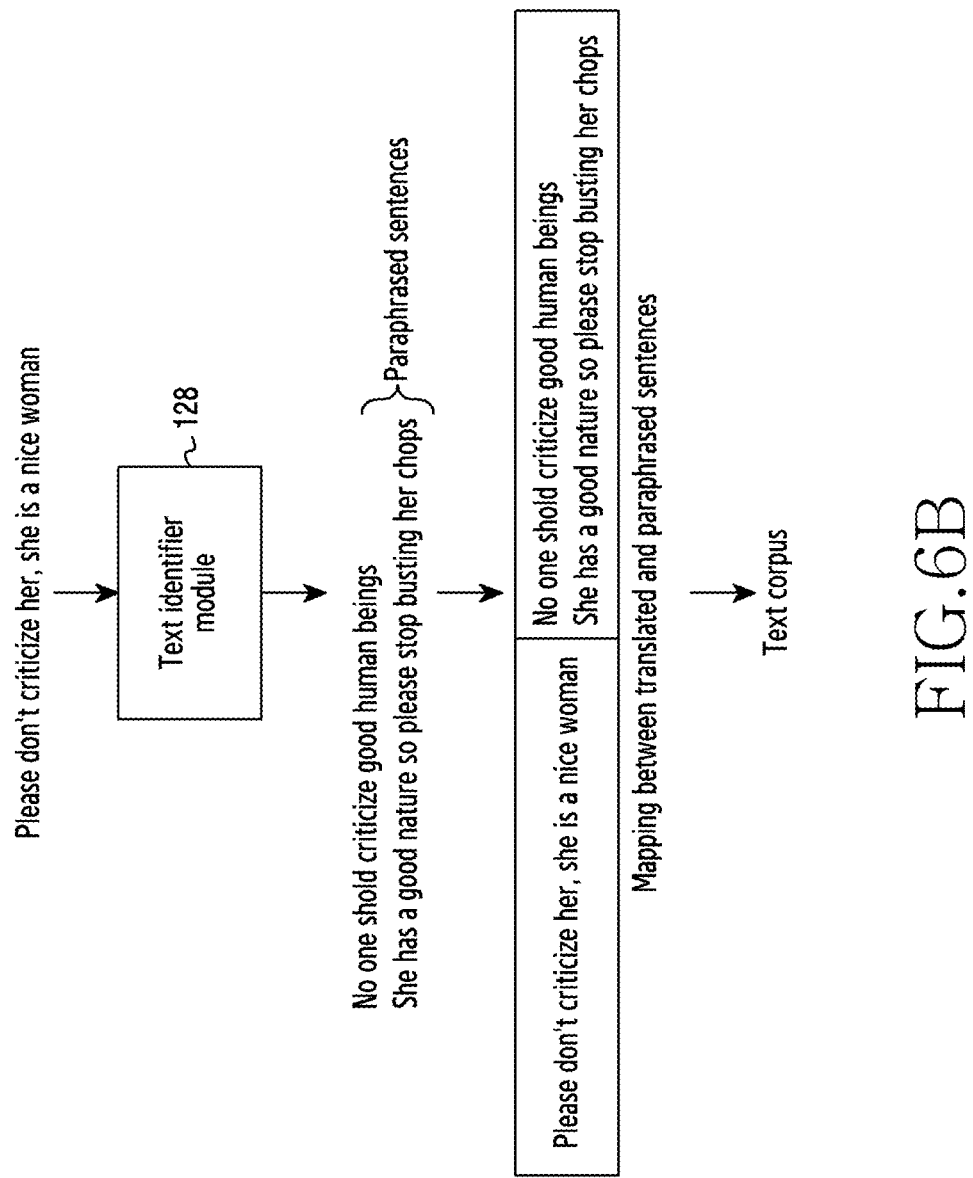

Referring now to FIGS. 6A-6B, a schematic representation of an operation of the text identifier module (128) is shown in accordance with an embodiment of the present invention.

The text identifier module (128) receives the input text data and generates the text corpus. As depicted in FIGS. 6A-6B, the text identifier module (128) maps the translated sentences and the paraphrased sentences to generate different variations of the translated and paraphrased sentences.

In FIG. 6A, the text identifier module (128) operates on a multilingual (Hindi-English) sentence to generate the text corpus.

In FIG. 6B, the text identifier module (128) operates on an English sentence to generate the text corpus. In this example, no translation is required since the sentence is already in English.

Referring now to FIG. 7, an example of a word bag is shown in accordance with an embodiment of the present invention.

In an embodiment, the text classifier module (130) groups the words in the word bag in different profiles for every user. For instance, a user may prefer a different set of words in one setting whereas a different set of words in another setting. In this case, the text classifier module (130) creates a first profile for the user in the first setting and a second profile for the user in the second setting. Thereafter, depending on the detected setting, the text classifier module (130) selects words from either the first profile or the second profile.

As depicted in FIG. 7, different profiles are stored for every user. The words used by the users are also stored in the bag along with the corresponding origin of the user, language of the word, frequency of use of the word, and the corresponding profile.

The context recognition module (122) identifies the context of the user while capturing the voice input signal. In an example, the context recognition module (122) identifies the context based on signals received from the input devices (114) such as location sensors, cameras, etc. In an example, when the user is at home, he/she uses a different set of words and when the user is in office, he/she uses a different set of words. This can be stored as a first profile corresponding to a first context (e.g. home) and a second profile corresponding to a second context (e.g. office).

Figure 8:
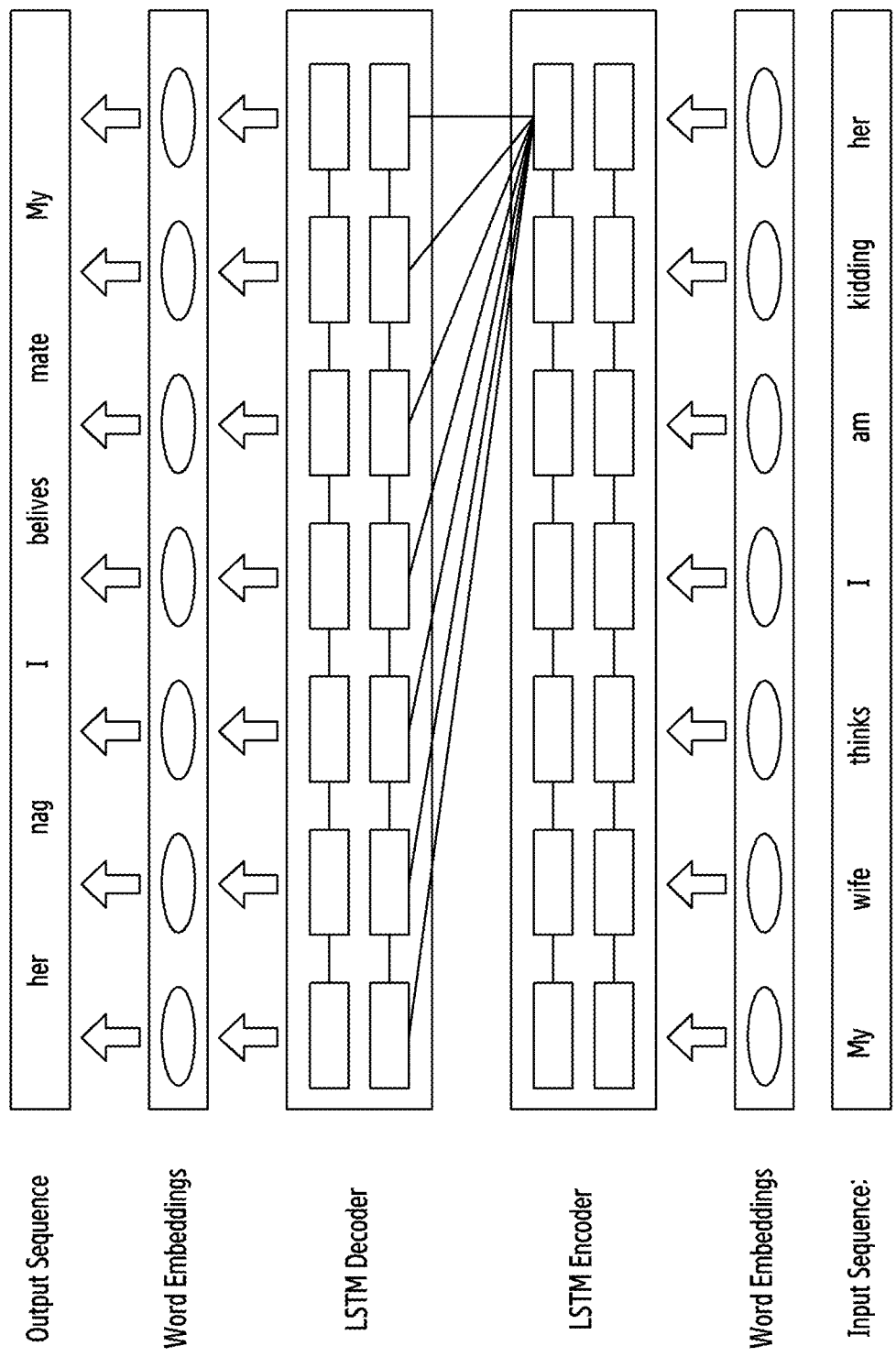
FIG. 8 shows a basic structural diagram of a text reconstruction module in accordance with another embodiment of the present invention.

Referring now to FIG. 8, a basic structural diagram of the text reconstruction module (112) is shown in accordance with an embodiment of the present invention. This text reconstruction module (112) reconstructs the primary text data in the form of the words which are specific to the user's word bag. In an example, the text reconstruction module (112) uses natural language processing based on Sequence to Sequence Recurrent Neural Networks with Long Short-term memory LSTM RNN. The training of the text reconstruction module (112) is based on the text corpus generated by the text identifier module (128). In an example, Sequence to Sequence LSTM RNN model, which consists of an encoder and a decoder of LSTM is used. In this, the model is trained to generate a target sequence given the input sequence. Sequence to Sequence recurrent neural network consists of two recurrent neural networks: (i) LSTM encoder which maps the input sequence of words into the dense vector representation and (ii) LSTM decoder conditioned on that vector representation to generate an output sequence of words.

Figure 9:
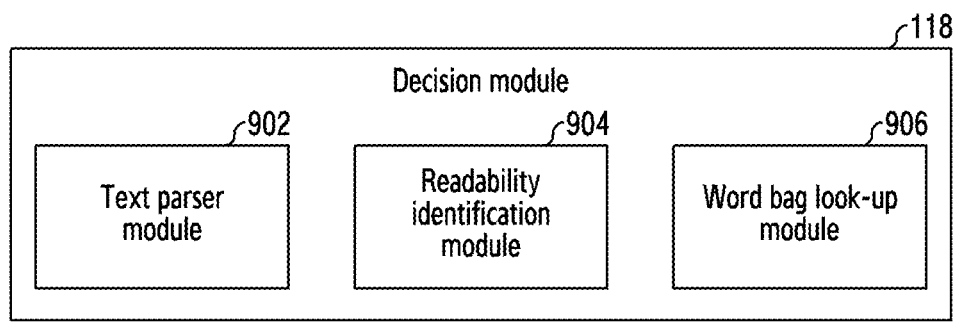
FIG. 9 shows a schematic block diagram of a decision module in accordance with another embodiment of the present invention.

Referring now to FIG. 9, a schematic block diagram of the decision module (118) is shown in accordance with an embodiment of the present invention. The decision module (118) includes a text parser module (902), a readability identification module (904), and a word bag look-up module (906).

In one condition, the text parser module (902) extracts words and phrases from the primary text data. The word bag look-up module (906) looks up for the extracted words and phrases in the tokens within the word bag of the corresponding user. If the word bag look-up module (906) finds that the look-up is below a predefined threshold, i.e., the words or phrases in the primary text data are not within the word bag of the user, the decision module (118) determines that the primary text data requires reconstruction.

In another condition, the readability identification module (904) computes a number of characters in the primary text data and compares the number with a predefined number of characters. For instance, the predefined number of characters may correspond to average readability rate of a person. If the readability identification module (904) finds that the number is greater than the predefined number of characters, the readability identification module (904) determines that the primary text data requires reconstruction.

In yet another condition, the text parser module (902) extracts the words and phrases from the primary text data. The word bag look-up module (906) searches for the extracted words and phrases in the frequently used words and phrases in the word bag of the corresponding user. If the extracted words and phrases are not found within the frequently used words and phrases within the word bag, the decision module (118) determines that the primary text data is to be reconstructed.

Figure 10:
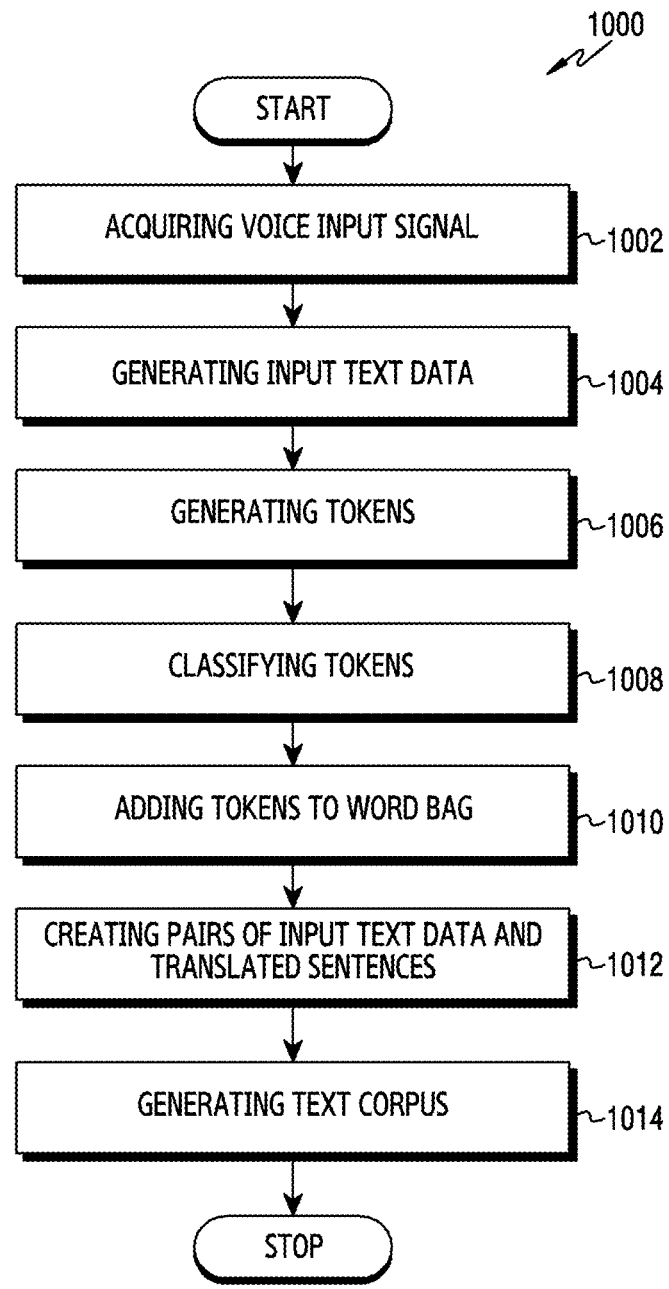
FIG. 10 is a flowchart illustrating a method of generating a text corpus in accordance with another embodiment of the present invention.

Referring now to FIG. 10, a flowchart illustrating a method of generating the text corpus is shown in accordance with an embodiment of the present invention.

At step 1002, the speech recognition module (120) receives the voice input signal.

At step 1004, the speech recognition module (120) generates the input text data.

At step 1006, the text classifier module (130) generates the tokens.

At step 1008, the text classifier module (130) classifies the tokens.

At step 1010, the text classifier module (130) adds the tokens to the word bag.

At step 1012, the text identifier module (128) generates translated sentences and pairs of the input text data and the translated sentences.

At step 1014, the text identifier module (128) generates the text corpus.

Figure 11:
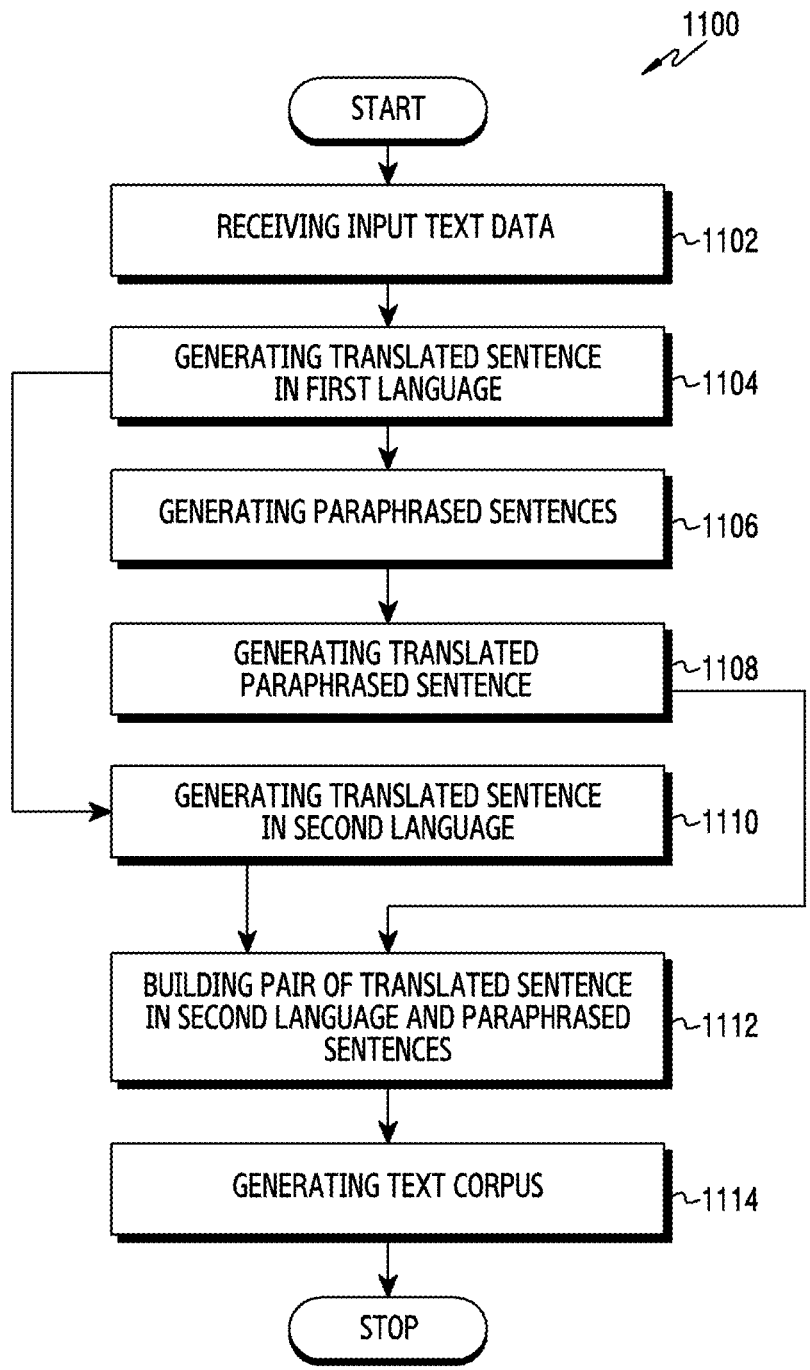
FIG. 11 is a flowchart illustrating a method of generating a text corpus in accordance with another embodiment of the present invention.

Referring now to FIG. 11, a flowchart illustrating a method of generating text corpus is shown in accordance with an embodiment of the present invention.

At step 1102, the text identifier module (128) receives the input text data.

At step 1104, the translator (502) translates the input text data into a first language.

At step 1106, the paraphraser (504) paraphrases the translated sentence.

At step 1108, the translator (502) translates the paraphrased sentences.

At step 1110, the translator (502) translates the input text data into a second language.

At step 1112, the text identifier module (128) builds a pair of the translated sentence in the second language and the paraphrased sentences.

At step 1114, the text identifier module (128) generates the text corpus.

Figure 12:
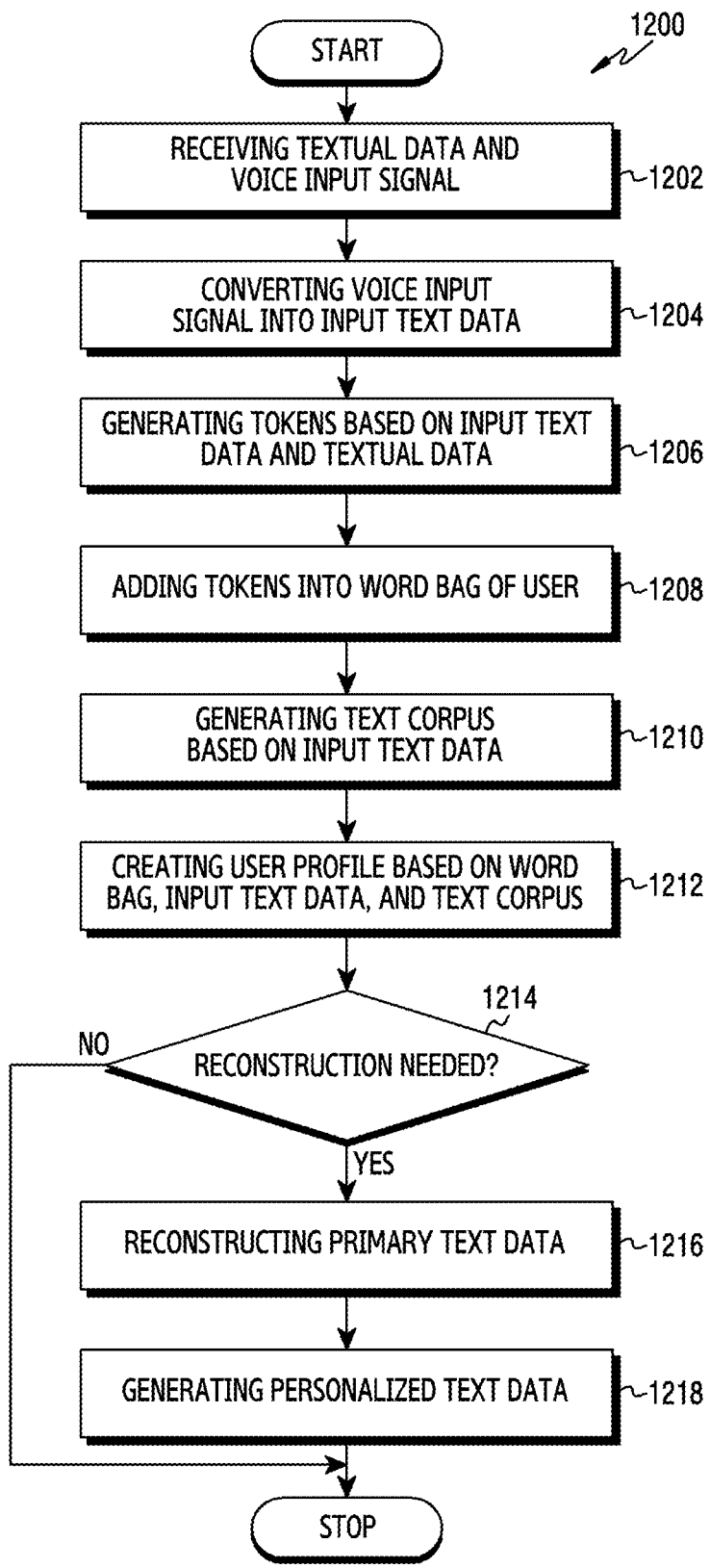
FIG. 12 is a flowchart illustrating a text reconstruction method in accordance with another embodiment of the present invention.

Referring now to FIG. 12, a flowchart illustrating a text reconstruction method is shown in accordance with an embodiment of the present invention.

At step 1202, the processing module (108) receive the textual data and the voice input signal corresponding to the user.

At step 1204, the speech recognition module (120) converts the voice input signal into the input text data.

At step 1206, the text classifier module (130) generates the tokens based on the input text data and the textual data.

At step 1208, the text classifier module (130) adds the tokens into the word bag of the user.

At step 1210, the text identifier module (128) generates the text corpus based on the input text data.

At step 1212, the user profile builder module (126) builds the user profile based on the word bag, the input text data, and the text corpus.

At step 1214, the decision module (118) determines whether the primary text data is to be reconstructed.

At step 1216, the text reconstruction module (112) reconstructs the primary text data.

At step 1218, the text reconstruction module (112) generates the personalized text data based on the user profile.

It should be noted that the description merely illustrates the principles of the present invention. It will thus be appreciated that those skilled in the art will be able to devise various arrangements that, although not explicitly described herein, embody the principles of the present invention.

Furthermore, all examples recited herein are principally intended expressly to be only for explanatory purposes to help the reader in understanding the principles of the invention and the concepts contributed by the inventor(s) to furthering the art and are to be construed as being without limitation to such specifically recited examples and conditions.

Moreover, all statements herein reciting principles, aspects, and embodiments of the invention, as well as specific examples thereof, are intended to encompass equivalents thereof.

The invention claimed is:

1. A method performed by a user equipment (UE) for reconstructing primary text data, the method comprising:
   receiving textual data and a voice input signal corresponding to a user, wherein the textual data includes a textual communication or social network interaction of the user;
   generating, based on a detection of words spoken by the user, input text data, wherein the detection of words is based on a feature vector that is indicative of acoustic characteristics of the voice input signal;
   generating tokens based on the input text data and the textual data, wherein the tokens include at least one of words, phrases, idioms, jargon, slang, or dialect related to the user;
   adding the tokens into a word bag corresponding to the user, wherein the word bag includes at least one of the tokens or labels corresponding to the tokens;
   generating (i) a text corpus based on the input text data and (ii) a user profile corresponding to the user based on the word bag, the input text data, and the text corpus, wherein the text corpus includes the input text data and at least one of translations, paraphrases, or contextual labels corresponding to the input text data;
   identifying words or phrases from a primary text data or a number of characters in the primary text data, wherein the primary text data includes at least one of media subtitles, virtual assistant output, or machine generated text data;
   determining, based on the word bag associated with the user profile and the words or phrases from the primary text data or the number of characters in the primary text data, whether reconstruction of the primary text data is required; and
   in case that the reconstruction of the primary text data is required, reconstructing the primary text data to generate a personalized text data based on the user profile, wherein the reconstructing of the primary text data is performed by a natural language processing operation based on a sequence to sequence long short-term memory (LSTM) RNN model that is trained based on the text corpus.

2. The method of claim 1, wherein the labels corresponding to the tokens comprise at least one of language of the tokens, contextual profile corresponding to the tokens, or frequency of use of the tokens by the user.

3. The method of claim 1, wherein a text reconstruction module is trained for reconstructing the primary text data based on the text corpus.

4. The method of claim 1, further comprising:
extracting one or more acoustic features from the voice input signal to generate the feature vector;
decoding the feature vector based on a lexicon to detect one or more words spoken by the user;
detecting one or more sentences spoken by the user based on an acoustic model, a linguistic model, or the detected words; and
generating the input text data based on the detected words and sentences.

5. The method of claim 4, further comprising:
identifying one or more languages of the words and sentences in the input text data;
classifying the words and sentences in the input text data;
labelling the classified words and sentences with corresponding languages; and
generating the tokens based on the classified words and sentences and corresponding labels.

6. The method of claim 5, further comprising:
translating the sentences in the input text data into one or more other languages to generate one or more translated sentences;
paraphrasing the sentences in the input text data to generate one or more paraphrased sentences;
translating the paraphrased sentences to generate one or more translated paraphrased sentences;
tagging the translated sentences, the paraphrased sentences, and the translated paraphrased sentences with the input text data; and
generating the text corpus, wherein the text corpus includes the input text data and the tagged translated sentences, paraphrased sentences, and translated paraphrased sentences corresponding to the input text data.

7. The method of claim 6, further comprising:
extracting words and phrases from the primary text data;
performing a lookup for the extracted words and phrases in the tokens in the word bag; and
determining that the primary text data is to be reconstructed when the lookup is below a predefined threshold of lookup.

8. The method of claim 7, further comprising:
computing a number of characters in the primary text data; and
determining that the primary text data is to be reconstructed when the computed number of characters is more than a predefined threshold of characters.

9. The method of claim 8, further comprising:
extracting words and phrases from the primary text data;
searching for frequently used words and phrases in the word bag, the frequently used words and phrases corresponding to the extracted words and phrases; and
determining that the primary text data is to be reconstructed based on the frequently used words and phrases in the word bag.

10. The method of claim 1, further comprising:
receiving the voice input signal and one or more sensory signals; and
identifying a context based on the received voice input signal and one or more sensory signals, the context being indicative of surrounding environment of the user, presence of other people in vicinity of the user, location of the user, and other contextual factors.

11. A user equipment (UE) for reconstructing primary text data, the UE comprising:
a transceiver; and
at least one processor coupled with the transceiver and configured to:
receive textual data and a voice input signal corresponding to a user, wherein the textual data includes a textual communication or social network interaction of the user;
generate, based on a detection of words spoken by the user, input text data, wherein the detection of words is based on a feature vector that is indicative of acoustic characteristics of the voice input signal;
generate tokens based on the input text data and the textual data, wherein the tokens include at least one of words, phrases, idioms, jargon, slang, or dialect related to the user;
add the tokens into a word bag corresponding to the user, wherein the word bag includes at least one of the tokens or labels corresponding to the tokens;
generate (i) a text corpus based on the input text data and (ii) a user profile corresponding to the user based on the word bag, the input text data, and the text corpus, wherein the text corpus includes the input text data and at least one of translations, paraphrases, or contextual labels corresponding to the input text data;
identifying words or phrases from a primary text data or a number of characters in the primary text data, wherein the primary text data includes at least one of media subtitles, virtual assistant output, or machine generated text data;
determine, based on the word bag associated with the user profile and the words or phrases from the primary text data or the number of characters in the primary text data, whether reconstruction of the primary text data is required; and
in case that the reconstruction of the primary text data is required, reconstruct the primary text data to generate a personalized text data based on the user profile, wherein the reconstructing of the primary text data is performed by a natural language processing operation based on a sequence to sequence long short-term memory (LSTM) RNN model which is trained based on the text corpus.

* * * * *